(12) United States Patent
Wolters

(10) Patent No.: US 6,583,790 B1
(45) Date of Patent: Jun. 24, 2003

(54) APPARATUS FOR AND METHOD OF CONVERTING HEIGHT FIELDS INTO PARAMETRIC TEXTURE MAPS

(75) Inventor: Hans Juergen Wolters, Mountain View, CA (US)

(73) Assignee: Hewlett-Packard Development Company LP, Houston, TX (US)

( * ) Notice: Subject to any disclaimer, the term of this patent is extended or adjusted under 35 U.S.C. 154(b) by 0 days.

(21) Appl. No.: 09/527,869

(22) Filed: Mar. 17, 2000

(51) Int. Cl.$^7$ .................................................. G09G 5/00
(52) U.S. Cl. ..................................... 345/584; 345/586
(58) Field of Search ................................ 345/581, 582, 345/584, 586

(56) References Cited

U.S. PATENT DOCUMENTS

| | | | |
|---|---|---|---|
| 5,490,240 A | * | 2/1996 | Foran et al. ................. 345/419 |
| 5,856,829 A | * | 1/1999 | Gray, III et al. ............ 345/581 |
| 5,949,424 A | | 9/1999 | Cabral et al. ............... 345/426 |

OTHER PUBLICATIONS

J.F. Blinn, "Simulation of Wrinkled Surfaces," Computer Graphics, vol. 12, No. 3, pp. 286–292 (1978).
H. Rushmeier et al., "Applying Shape from Lighting Variation to Bump Map Capture," Proc. Eurographics, vol. 97, pp. 35–47 (1997).

* cited by examiner

Primary Examiner—Matthew Luu

(57) ABSTRACT

A graphics system that employs parametric texture maps that are converted from height fields. The system samples a hemisphere equidistantly to produce an array of normals, approximates a dot product of each sampled normal with an arbitrary unit vector, transforms the polynomials back to canonical basis, converts a height field to normals, and for each normal in the height field determines coefficients for a parametric texture map. The system then evaluates a diffuse contribution using the parametric texture map coefficients. The system may also then evaluate a specular contribution using the parametric texture map coefficients. The graphics system renders surface features of a 3D object in a manner that is direction dependent but without the time consuming and expensive calculations involved in the evaluation of lighting equations on a per pixel basis. A parametric texture map holds a set of parameters that define a surface structure in a manner in which the appearance of the surface structure varies in response to a direction vector. The direction vector may be any user-defined vector including a light source vector or a half-angle vector. The parameters are those of a predetermined equation, the evaluation of which does not involve vector calculations. The equation may take any form including a polynomial equation or a non-polynomial equation. The graphic system renders a polygon with the surface structure using the equation.

9 Claims, 6 Drawing Sheets

APPARATUS FOR AND METHOD OF CONVERTING HEIGHT FIELDS INTO PARAMETRIC TEXTURE MAPS

BACKGROUND OF THE INVENTION

1. Field of the Invention

The present invention relates generally to the field of computer graphics and pertains more particularly to an apparatus for and a method of converting height fields into parametric texture maps in a computer graphics system.

2. Discussion of the Prior Art

Modern computer systems have become increasingly graphics intensive. Dedicated special purpose memories and hardware have been developed to meet this need. A conventional computer graphics system includes a display device having a two-dimensional (2D) array of light emitting areas. The light emitting areas are usually referred to as pixels which is an abbreviation for picture elements. Such a graphics system typically employs hardware, software, or both to generate a 2D array of values that determine the colors or shades of grey that are to be emitted from the corresponding pixels of the display.

Computer graphics systems are commonly employed for the display of three-dimensional (3D) objects. Typically, such a system generates what appears to be a 3D object on a 2D display by generating 2D views of the 3D object that is modeled in the computer memory. The 2D view of a 3D object which is generated at a particular time usually depends at least on a spatial relationship between the 3D object and a viewer of the 3D object at the particular time.

The process by which a computer graphics system generates the values for a 2D view of a 3D object is commonly referred to as image rendering or scan conversion. The graphics system usually renders a 3D object by subdividing the 3D object into a set of polygons and rendering each of the polygons individually.

The values for a polygon that are rendered for a particular view direction usually depend on the surface features of the polygon and the effects of lighting on the polygon. The surface features include details such as surface colors and surface structures. The effects of lighting usually depend on a spatial relationship between the polygon and one or more light sources. Typically, the evaluation of the effects of lighting on an individual pixel in a polygon for a particular view direction involves a number of 3D vector calculations. One of ordinary skill in the art will-recognize that the standard Blinn/Phong lighting equation is as follows:

$$I = k_a I_a + k_d I_d (N \cdot L) + k_s I_s (N \cdot H)^n \qquad (1)$$

where $k_a$, $k_d$, and $k_s$ are constants. Equation (1) states that the light intensity I for a particular pixel is a function of the sum of the ambient contribution $I_a$, the diffuse contribution $I_d$, and the specular contribution $I_s$ at that location.

One conventional method for rendering features that are smaller than the area of a polygon is to employ what is commonly referred to as a texture map. A typical texture map is a table that contains a pattern of color values for a particular surface feature. Unfortunately, texture mapping usually yields relatively flat surface features that do not change with the view direction or light source direction. The appearance of real 3D objects, on the other hand, commonly do change with the view direction, light source direction, or both. These directional changes are commonly caused by 3D structures on the surface of the object, that is, the object is not perfectly flat. Such structures can cause localized shading or occlusions or changes in specular reflections from a light source. The effects can vary with view direction for a given light source direction and can vary with light source direction for a given view direction. These directional changes should be accounted for to provide greater realism in the rendered 2D views.

One conventional method for handling the directional dependence of such structural effects in a polygon surface is to employ what is commonly referred to as a bump map. Bump mapping is based on the realization that the effect of surface structures on the perceived intensity is primarily due to the effect of the structure on the surface normal rather than their effect on the position of the surface. Therefore, one can obtain a good effect by having a texturing function which performs a small perturbation on the direction of the surface normal before using the normal in Equation (1). The normal vector perturbation is defined in terms of a function which gives the displacement of the irregular surface from the ideal smooth one. A typical bump map contains a height field from which a pattern of 3D normal vectors for a surface are extracted. The normal vectors are used to evaluate lighting equations at each pixel in the surface. Unfortunately, such evaluations typically involve a number of expensive and time consuming 3D vector calculations including division and square roots. This can result in decreased rendering speed or increased graphics system cost.

A definite need exists for a system having an ability to meet the efficiency requirements of graphics intensive computer systems. In particular, a need exists for a system which is capable of employing height fields in a skillful manner. Ideally, such a system would have a lower cost and a higher productivity than conventional systems. With a system of this type, system performance can be enhanced. A primary purpose of the present invention is to solve this need and provide further, related advantages.

SUMMARY OF THE INVENTION

A graphics system is disclosed that employs parametric texture maps that are converted from height fields. The system samples a hemisphere equidistantly to produce an array of normals, approximates a dot product of each sampled normal with an arbitrary unit vector, transforms the polynomials back to canonical basis, converts a height field to nornmals, and for each normal in the height field determines coefficients for a parametric texture map. The system then evaluates a diffuse contribution using the parametric texture map coefficients. The system may also then evaluate a specular contribution using the parametric texture map coefficients. The graphics system renders surface features of a 3D object in a manner that is direction dependent but without the time consuming and expensive calculations involved in the evaluation of lighting equations on a per pixel basis. A parametric texture map holds a set of parameters that define a surface structure in a manner in which the appearance of the surface structure varies in response to a direction vector. The direction vector may be any user-defined vector including a light source vector or a half-angle vector. The parameters are those of a predetermined equation, the evaluation of which does not involve vector calculations. The equation may take any form including a polynomial equation or a non-polynomial equation. The graphic system renders a polygon with the surface structure using the equation.

BRIEF DESCRIPTION OF THE DRAWING

The above and other objects and advantages of the present invention will be more readily appreciated from the following detailed description when read in conjunction with the accompanying drawing, wherein.

DETAILED DESCRIPTION OF THE PREFERRED EMBODIMENTS

Figure 1:
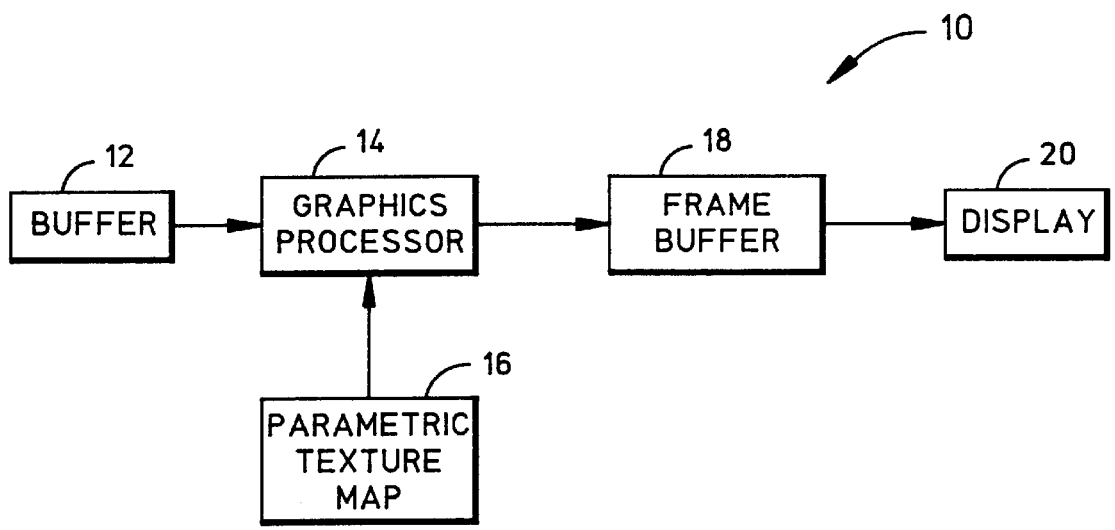
FIG. 1 is a block diagram of a computer graphics system according to a preferred embodiment of the present invention.

Turning first to FIG. 1, a block diagram of a computer graphics system 10 according to a preferred embodiment of the present invention is shown. The computer graphics system 10 includes a buffer 12, a graphics processor 14, a parametric texture map 16, a frame buffer 18, and a display 20. The buffer 12 holds geometry data that describes a 3D object which is to be generated on the display 20. The 3D object is represented in the buffer 12 as a set of polygons in a 3D space. In one embodiment, the polygons are triangles and the geometry data in the buffer 12 includes the 3D coordinates of the vertices of the triangles.

The graphics processor 14 reads the parameters that define the polygons from the buffer 12 and scan converts each polygon. The scan conversion of a polygon yields a 2D view of the polygon which depends on a view direction and a light source direction. A 2D view of a polygon includes a color value for each pixel of the polygon which is visible in the plane of the display 20. The graphics processor 14 writes the color values for the rendered polygons into the frame buffer 18. The color values from the frame buffer 18 are provided to the display 20 on a frame by frame basis. The display 20 can be any conventional 2D display device such as a raster scan device or flat-panel display device.

The parametric texture map 16 holds parameters that define a surface structure in a manner in which the appearance of the surface structure varies with any user-defined vector such as the view vector, the light source vector, or the half-angle vector. The half-angle vector is a vector that is halfway between the view and light vectors. The graphics processor 14 maps the surface structure defined in the parametric texture map 16 onto the polygons obtained from the buffer 12 during scan conversion. The result is a more realistic rendering of 3D features in a surface on a 3D object in comparison to texture mapping but without the computational penalties associated with bump mapping.

In one embodiment, the parameters contained in the parametric texture map 16 are the A1, A2, A3, A4, A5, and A6 coefficients for evaluating the following second order polynomial equation:

$$C_i = A1 D_u^2 + A2 D_v^2 + A3 D_u D_v + A4 D_u + A5 D_v + A6 \quad (2)$$

where $D_u$ and $D_v$, are the 2D components of the user-defined vector. For example, if the parametric texture map 16 is adapted to the view direction then $D_u$ and $D_v$ are the 2D components of an eye point vector. Likewise, the terms $D_u$ and $D_v$ are the 2D components of a half-angle vector if the parametric texture map 16 is adapted to the half-angle vector.

TABLE 1 illustrates the general contents of the parametric texture map 16. The parametric texture map 16 contains n by m entries. Each of the n by m entries corresponds to a sample of a particular surface modeled by the parametric texture map 16. These samples may be referred to as texels which is an abbreviation for texture elements. The coefficients for an individual texel are denoted as $A1_{ij}$ to $A6_{ij}$ wherein i ranges from one to n and j ranges from one to m.

TABLE 1

| $A1_{1,1}$ | $A2_{1,1}$ | $A1_{1,2}$ | $A2_{1,2}$ | ... | $A1_{1,m}$ | $A2_{1,m}$ |
| $A3_{1,1}$ | $A4_{1,1}$ | $A3_{1,2}$ | $A4_{1,2}$ | ... | $A3_{1,m}$ | $A4_{1,m}$ |
| $A5_{1,1}$ | $A6_{1,1}$ | $A5_{1,2}$ | $A6_{1,2}$ | ... | $A5_{1,m}$ | $A6_{1,m}$ |
| $A1_{2,1}$ | $A2_{2,1}$ | $A1_{2,2}$ | $A2_{2,2}$ | ... | $A1_{2,m}$ | $A2_{2,m}$ |
| $A3_{2,1}$ | $A4_{2,1}$ | $A3_{2,2}$ | $A4_{2,2}$ | ... | $A3_{2,m}$ | $A4_{2,m}$ |
| $A5_{2,1}$ | $A6_{2,1}$ | $A5_{2,2}$ | $A6_{2,2}$ | ... | $A5_{2,m}$ | $A6_{2,m}$ |
| . | . | . | . | | . | . |
| . | . | . | . | | . | . |
| . | . | . | . | | . | . |
| $A1_{n,1}$ | $A2_{n,1}$ | $A1_{n,2}$ | $A2_{n,2}$ | ... | $A1_{n,m}$ | $A2_{n,m}$ |
| $A3_{n,1}$ | $A4_{n,1}$ | $A3_{n,2}$ | $A4_{n,2}$ | ... | $A3_{n,m}$ | $A4_{n,m}$ |
| $A5_{n,1}$ | $A6_{n,1}$ | $A5_{n,2}$ | $A6_{n,2}$ | ... | $A5_{n,m}$ | $A6_{n,m}$ |

The parametric texture map 16 is representative of a set of parametric texture maps that may be used for rendering 3D objects in the graphics system 10. Each parametric texture map according to the present technique is adapted to a particular surface structure that is to be mapped onto a 3D object. In addition, each parametric texture map is adapted to provide realistic 3D rendering in response to the user-defined vector. For example, the parametric texture map 16 may be adapted to provide realistic 3D rendering in response to a varying light source direction for a given fixed view direction. Alternatively, the parametric texture map 16 may be adapted to provide realistic 3D rendering in response to a varying view direction for a given fixed light source direction.

In one embodiment, a parametric texture map may be adapted to a particular color channel of the display 20. For example, the graphic system 10 may include a separate parametric texture map for each of the red, green, and blue channels for an RGB display for a particular surface structure. One drawback to this approach is that three parametric texture maps are required. Alternatively, a single parametric texture map may be multiplied with each channel in a complete RGB texture map. In this embodiment, the parametric texture map encodes the brightness changes as a result of changes in the light vector, for example, and modulates the RGB color values in a corresponding texture map to yield the resultant color values. It is also possible to render objects illuminated by multiple light sources using this type of parametric texture map. Since the RGB color values are separate from the intensity, the intensity values can be calculated for different light sources and combined to get a final intensity value. The per-pixel intensity values are then multiplied with the RGB values to get the output color. A wide range of useful operations can be achieved by using different blending modes to combine parametric texture map evaluation results with calculated lighting, texture maps, or other sources during texture blending in the graphics pipeline.

Figure 2:
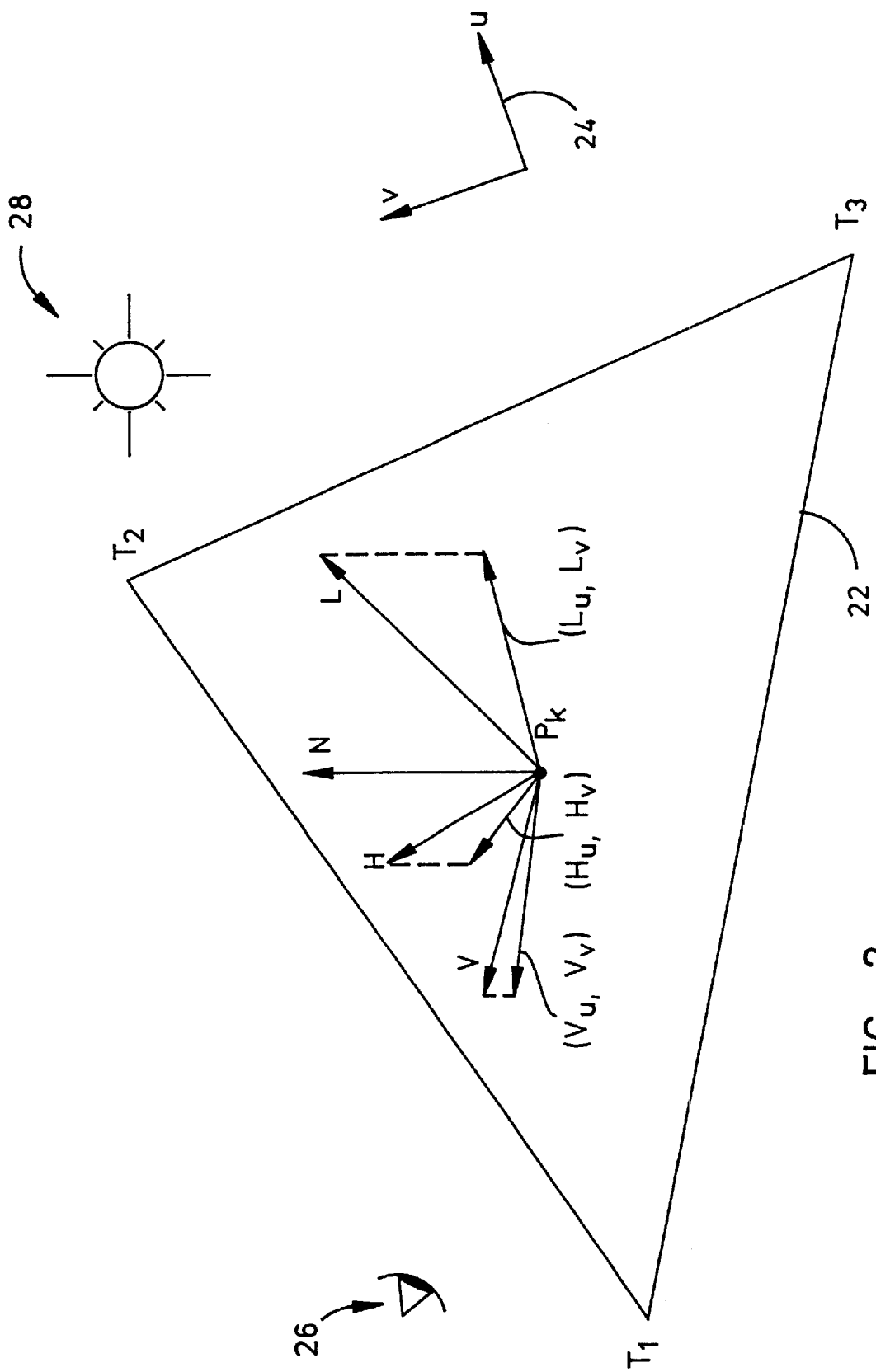
FIG. 2 is a graphical representation of a polygon which is defined in the buffer of FIG. 1 and which is to be rendered by the graphics processor of FIG. 1 using surface features defined by the parametric texture map of FIG. 1.

Turning now to FIG. 2, a graphical representation of a polygon 22 which is defined in the buffer 12 of FIG. 1 and which is to be rendered by the graphics processor 14 of FIG.

1 using surface features defined by the parametric texture map 16 of FIG. 1 is shown. The polygon 22 is defined by a set of three vertices ($T_1$, $T_2$, and $T_3$) in a 3D space. The local coordinate space is represented by a set of u and v axes 24 which are usually defined by the spatial texture coordinates of the polygon 22.

A surface normal vector N for the polygon 22 is shown, along with an eye point vector V, a light source vector L, and a half-angle vector H. Note that normal vectors are usually defined for the vertices rather than the entire polygon to improve realism. Here a single normal for the polygon is illustrated for simplicity. The eye point vector V represents a view direction from a pixel $P_k$ of the polygon 22 to an eye point 26. The light source vector L represents a light source direction from the pixel $P_k$ to a light source 28. The half-angle vector H represents the vector that is halfway between the eye point vector V and the light source vector L. Also shown is a ($V_u$, $V_v$) vector which is the eye point vector V projected down into the plane of the polygon 22. Likewise, a ($L_u$, $L_v$) vector is the projection of the light source vector L and a ($H_u$, $H_v$) vector is the projection of the half-angle vector H.

Figure 3:
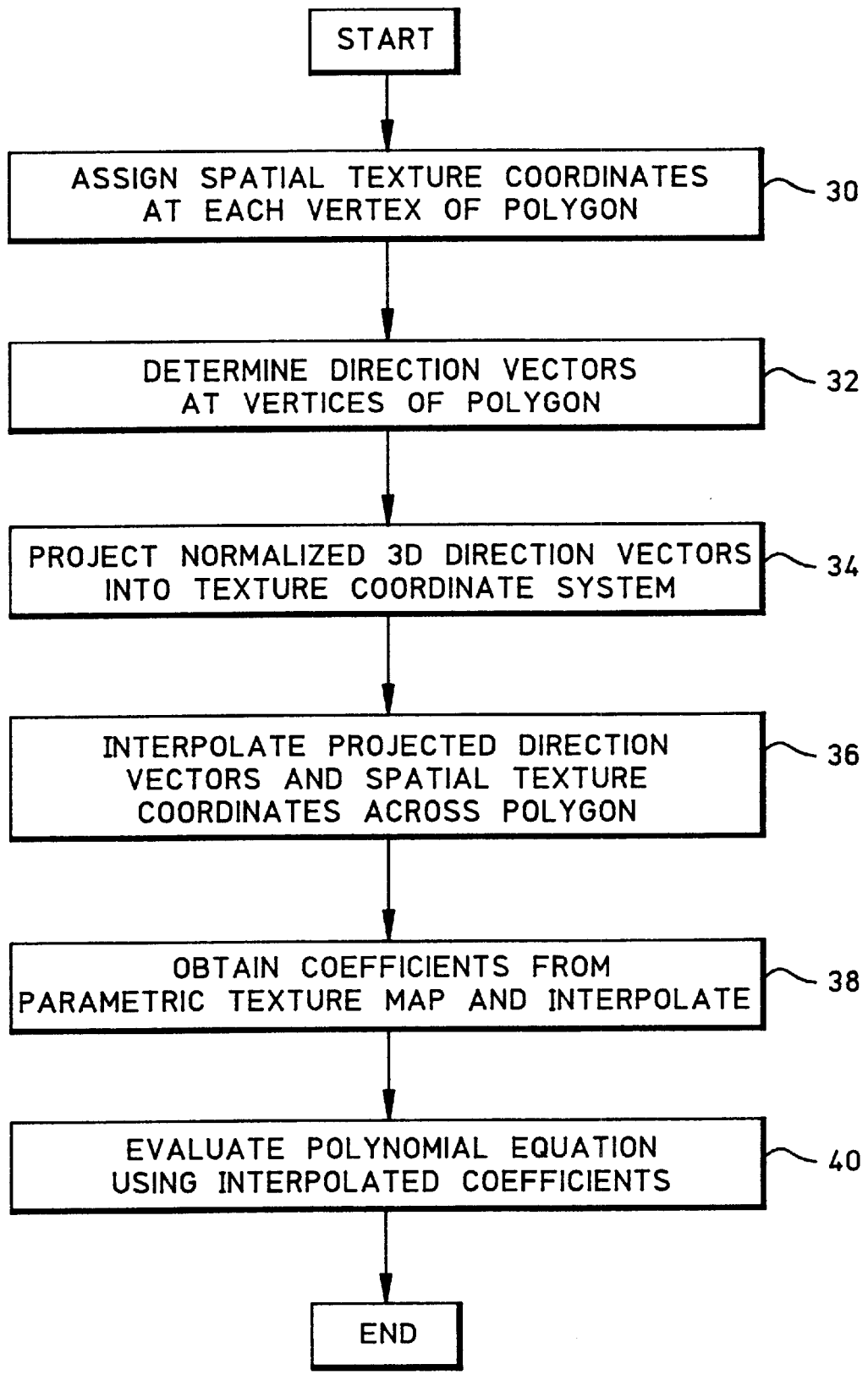
FIG. 3 is a flow diagram of a method according to the present invention for rendering a polygon using surface features defined by a parametric texture map.

FIG. 3 shows a flow diagram of a method according to the present invention for rendering a polygon using surface features defined by a parametric texture map. The steps shown are used to generate a color value for each of a set of pixels in the polygon 22 of FIG. 2. The following description for purposes of illustration focuses on the pixel $P_k$ of FIG. 2 as an example. The coefficients $A1_{ij}$ to $A6_{ij}$ in the parametric texture map 16 of FIG. 1 are adapted to yield color values in response to a user-defined vector such as a light source vector or an half-angle vector. This adaptation is done by using linear regression from a set of images that provide color values at each pixel for varying vector directions. The following description for purposes of illustration focuses on an example in which the coefficients $A1_{ij}$ to $A6_{ij}$ are adapted to yield color values in response to a light source vector for a fixed eye point vector. Nevertheless, these techniques are readily applicable to a parametric texture map which contains coefficients that are adapted to yield color values in response to any user-defined vector. In addition, the coefficients $A1_{ij}$ to $A6_{ij}$ in the parametric texture map 16 yield color values for a particular color channel of the display 20 of FIG. 1. Additional parametric texture maps may be used to yield color values for the remaining channels. The steps are repeated with each polygon in the set of polygons representing the 3D object that is stored in the buffer 12 of FIG. 1. The process begins at START.

At step 30, the graphics processor 14 of FIG. 1 assigns spatial texture coordinates u and v of the parametric texture map 16 at each vertex $T_1$, $T_2$, and $T_3$ of the polygon 22. The spatial texture coordinates for the vertices $T_1$, $T_2$, and $T_3$ are denoted as $u_{T1}$, $v_{T1}$, $u_{T2}$, $v_{T2}$, and $u_{T3}$, $v_{T3}$, respectively.

At step 32, the graphics processor 14 determines direction vectors at the vertices of the polygon 22. The direction vectors in this example are light source vectors at the vertices of the polygon 22. The light source vector at the vertex $T_1$ is a normalized 3D vector that points from $T_1$ to the 3D coordinates of the light source 28 of FIG. 2. Similarly, the light source vector at the vertices $T_2$ and $T_3$ are normalized 3D vectors that point from $T_2$ and $T_3$, respectively, to the 3D coordinates of the light source 28.

At step 34, the graphics processor 14 projects the normalized 3D direction vectors determined at step 32 into the texture coordinate system u and v of the parametric texture map 16. This yields 2D parameterization or 2D components of each normalized 3D direction vector in the texture coordinate system of the parametric texture map 16. A 2D parameterization of a normalized 3D direction vector is denoted as $D_u$, $D_v$.

At step 36, the graphics processor 14 interpolates the projected direction vectors $D_u$, $D_v$ determined at step 34 and spatial texture coordinates $u_{T1}$, $v_{T1}$, $u_{T2}$, $v_{T2}$, and $u_{T3}$, $v_{T3}$ determined at step 30 across the polygon 22. This associates each pixel of the polygon 22 with $D_u$, $D_v$ parameters and with u and v texel coordinates in the coordinate space of the parametric texture map 16. The interpolation of step 36 may be performed using a variety of known techniques.

At step 38, the graphics processor 14 obtains the polynomial coefficients $A1_{ij}$ to $A6_{ij}$ from the parametric texture map 16 and interpolates them. It is important to note that there are several options for evaluating and interpolating the texture map. Interpolated texture coordinates will not yield exact texels in the input texture map so texture interpolation is needed. These interpolation methods are well known and include nearest-neighbor, bilinear, trilinear, and anisotropic interpolation. One option is to evaluate the polynomial at each of the sample points and then to interpolate the output value. Another option is to interpolate the polynomial coefficients to generate an interpolated polynomial and then to evaluate the polynomial. FIG. 3 illustrates the second option.

At step 40, the graphics processor 14 evaluates Equation (2) using the interpolated $D_u$ and $D_v$ terms from step 36 and the interpolated coefficients $A1_{ij}$ to $A6_{ij}$ from step 38 on a per pixel basis. For pixel $P_k$, Equation (2) yields a texel value $C_i$ which may then be used as a color value, luminance value, or other pixel or texture data.

It is generally the case that parametric texture mapping effects should only be applied to polygons that are front facing relative to the user-defined vector being used. In order to identify front facing and back facing polygons, a third variable is used. This third parameter D is typically the result of projecting the user-defined vector onto the vertex normal vectors. For front facing polygons, D will be positive and for back facing polygons, D will be negative. Fundamentally, D is the dot product between the vertex normal vector and the user-defined vector. It may or may not be desirable to have the parametric texture mapping effects stop abruptly at the transition from front facing to back facing. If desirable, the user can attenuate the effects to give a sharp or gradual cutoff as needed, possibly including evaluation for triangles that are back facing with respect to the user-defined vector.

The present techniques model the 3D effects of surface features by modeling the contribution of those features to surface colors directly. The contributions are then represented by the coefficients of Equation (2). The present techniques yield a mapping of surface features to a polygon that is direction dependent and that provides a quality of realism which is comparable to that yielded by the evaluation of lighting equations on a per pixel basis. Yet the evaluation of Equation (2), a second order polynomial, is relatively easy to perform in hardware, software, or both in comparison to the evaluation of lighting equations on a per pixel basis. The evaluation of Equation (2) involves integer multiply and add operations whereas the evaluation of lighting equations involves floating-point, square-root and divide operations. Although Equation (2) has been chosen to be a bi-quadratic polynomial, bi-cubic and higher order polynomials could also be used. Even non-polynomial functions could be supported by the present techniques. However, more complex functions are not currently preferred due to their higher implementation costs which are currently considered excessive.

Figure 4:
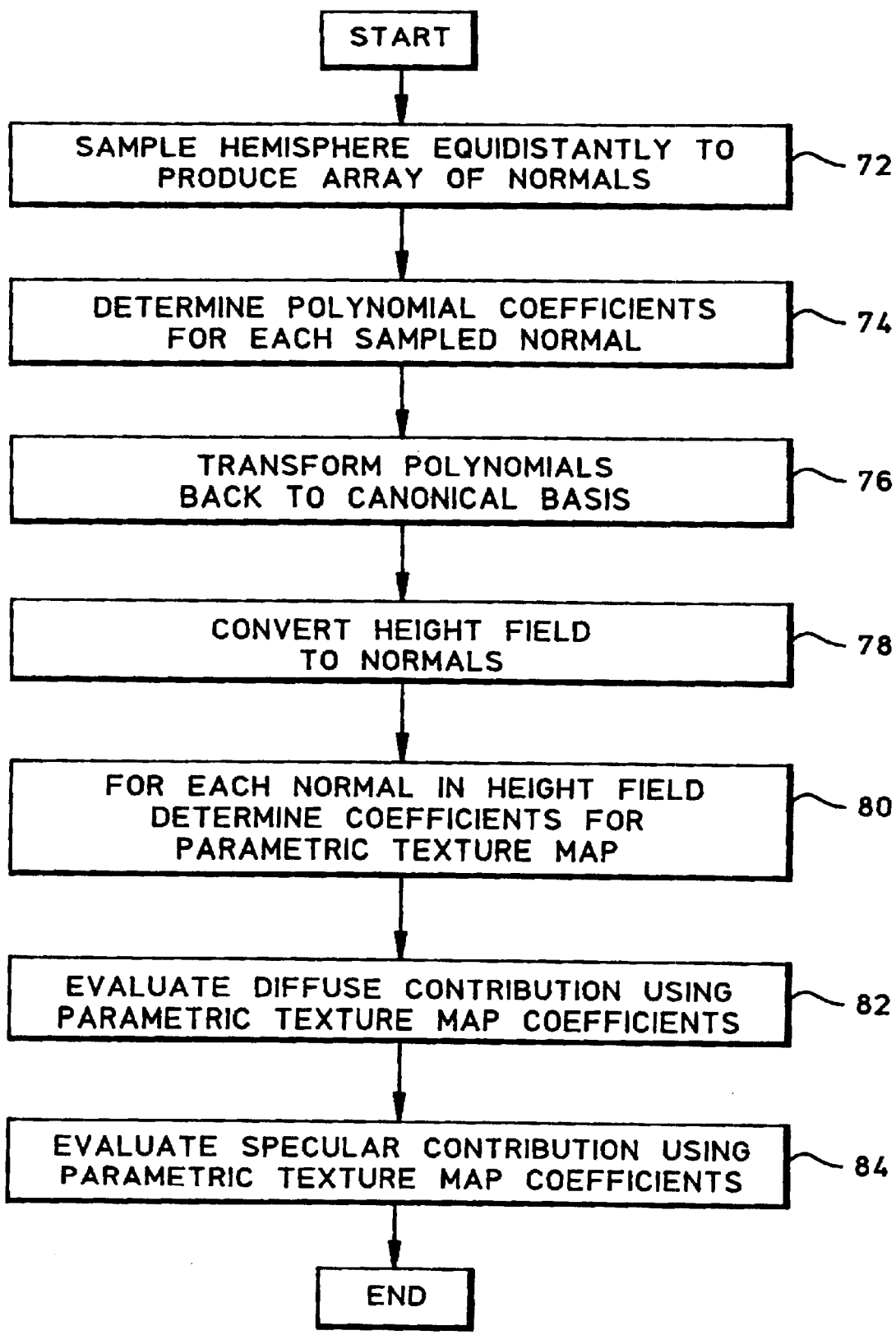
FIG. 4 is a flow diagram of a method of converting height fields to parametric texture maps according to the present invention.
Figure 5:
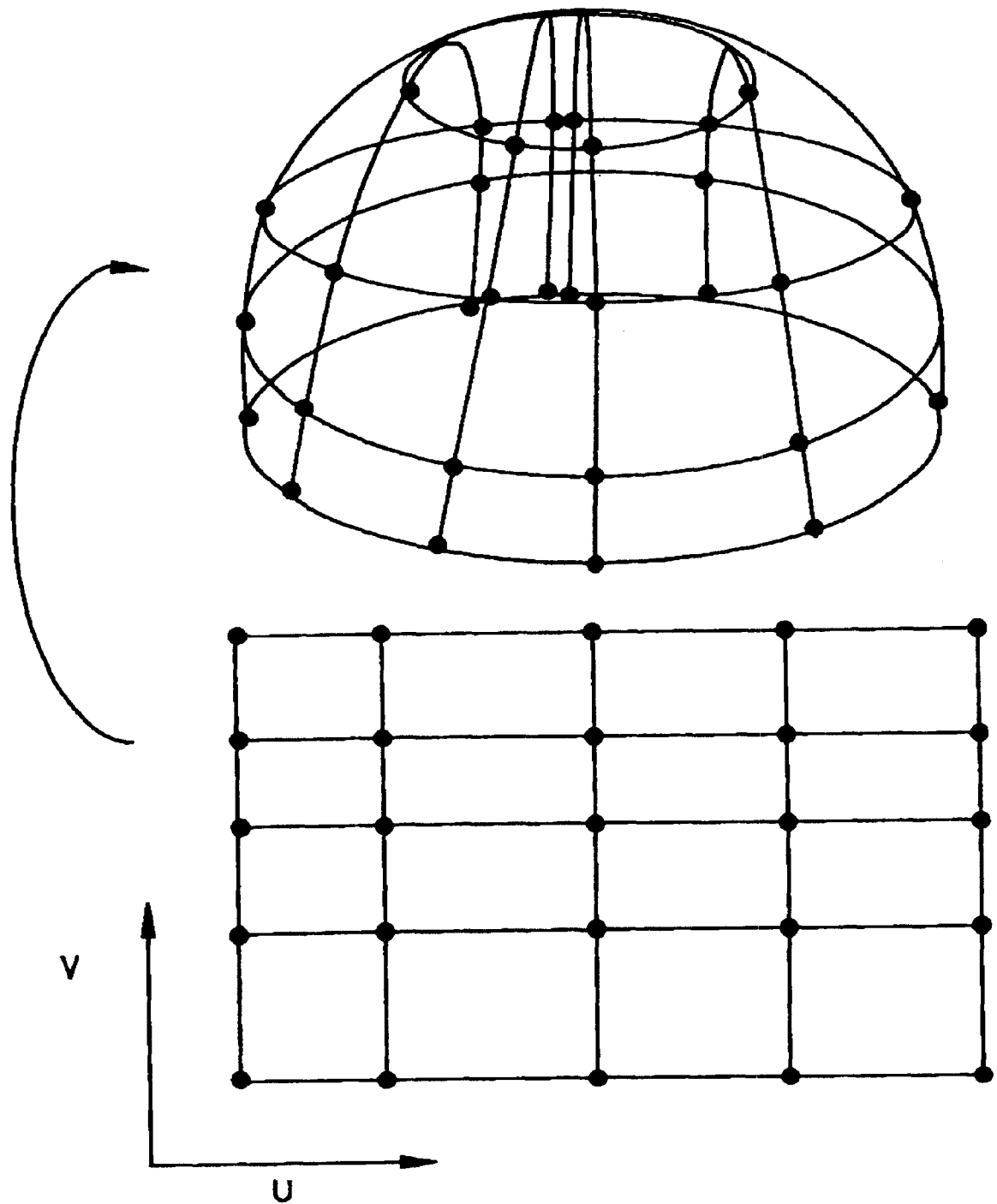
FIG. 5 is a graphical representation of the correspondence of a 3D sampling dome to a 2D sampling grid.

Turning now to FIG. 4, a flow diagram of a method of converting height fields to parametric texture maps according to the present invention is shown. The process begins at START. At step 72, the process samples the hemisphere equidistantly to produce an array of normals. This is accomplished by first dividing the hemisphere vertically with parallel planes resulting in concentric rings. Then the hemisphere is divided horizontally with parallel planes resulting in parallel quarter-circles. The resulting divided hemisphere is sampled at each intersection of the two divisions. FIG. 5 shows a graphical representation of the correspondence of a 3D sampling dome to a 2D sampling grid.

At step 74, the process determines the polynomial coefficients for each sampled normal. This is accomplished by approximating a dot product of each sampled normal with an arbitrary unit vector. First realize that according to Equation (1), the diffuse and specular contributions at a point are dependent exclusively on the respective dot products which involve the normal N at that particular location. Next, assume that the normal N is fixed and consider the general function as follows:

$$F(u,v):=uN_x+vN_y+\sqrt{1-u^2-v^2}N_z \quad (3)$$

The goal is to approximate Equation (3) with the second order polynomial of Equation (2). In order to accomplish this, one needs to minimize the quantity $$\int_{-1}^{1}\int_{-1}^{1}(C_i - F)^2 du dv \quad (4)$$

which is the square of the continuous $L_2$ norm. Note that one is minimizing over the domain $[-1, 1]^2$ even though one is only interested in the smaller domain of the unit circle. The reason is that the natural basis functions for the domain of the unit circle are spherical harmonics which involve the computation of trigonometric functions. In order to minimize Equation (4), one has to first transform the polynomial basis of B=$\{1, u, v, uv, u^2, v^2\}$ into a basis of B' which is orthonormal on the domain $[-1, 1]^2$. The basis B' is as follows:

$$B' = \left\{\frac{1}{2}, \frac{\sqrt{3}}{2}u, \frac{\sqrt{3}}{2}v, \frac{3}{2}uv, \frac{\sqrt{45}}{4}u^2 - \frac{\sqrt{45}}{12}, \frac{\sqrt{45}}{4}v^2 - \frac{\sqrt{45}}{12}\right\} \quad (5)$$

By using fundamentals from approximation theory, one realizes that the coefficients $A_i'$ of the best approximant $C_i'$ can be computed directly as values of the following integrals:

$$A_i' = \int_{-1}^{1}\int_{-1}^{1} C_i' F du dv \quad (6)$$

where $C_i'$ is the i-th basis polynomial of B'.

At step 76, the process transforms the polynomials back to the canonical basis, that is, the coefficients $A_i'$ are transformed back to the coefficients $A_i$. The resulting polynomial coefficients are then stored in a look-up table. Steps 72–76 are performed only once as a pre-process to the remainder of the steps. It is important to realize that steps 72–76 are independent of the specific height field or of the parametric texture map.

Figure 6:
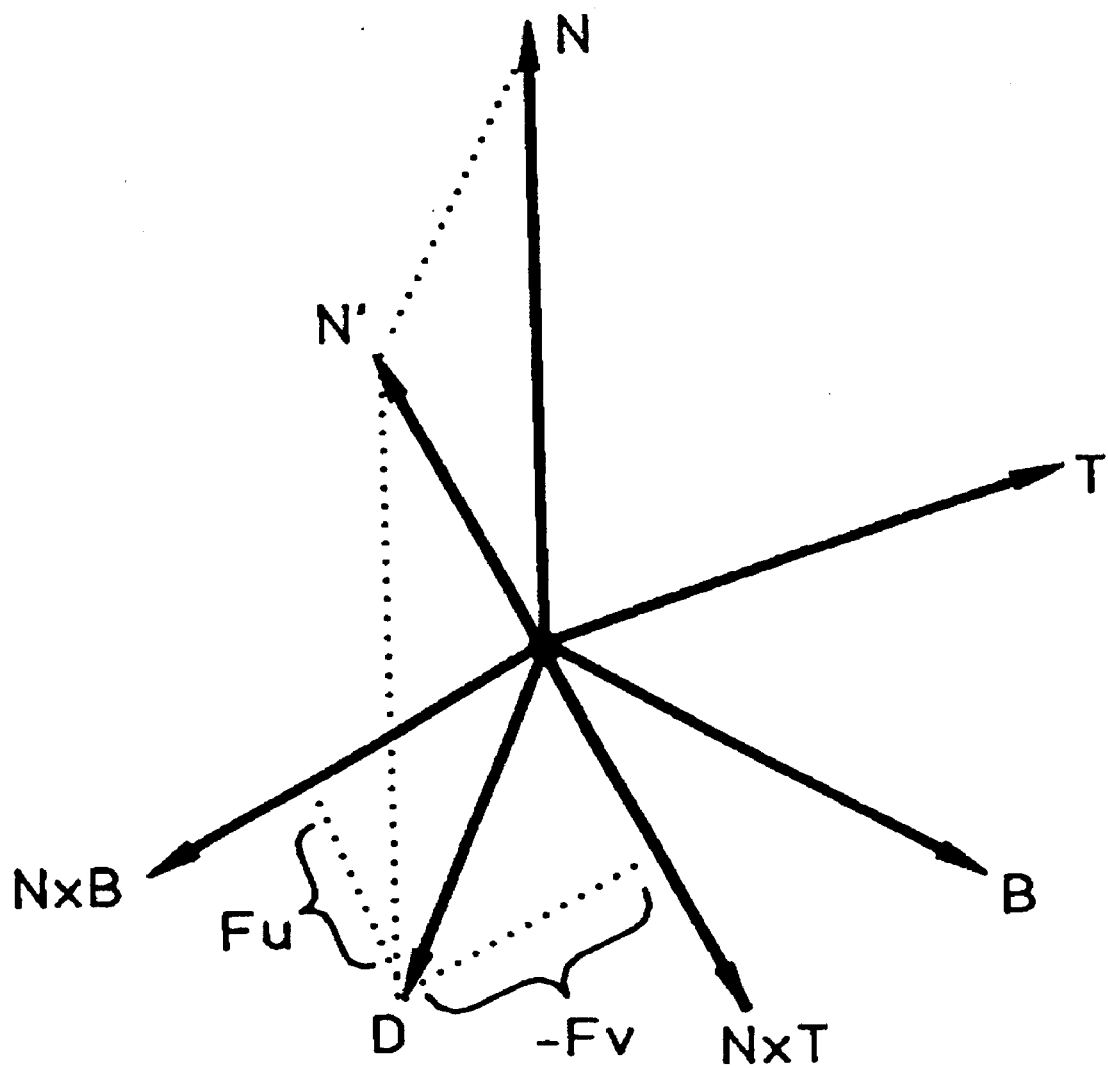
FIG. 6 is a graphical representation of the conversion of one example normal.

At step 78, a preselected height field is converted into normals. This step in the process is well known in the art. The resulting normals are based on the approximation that the magnitude of the heights is small in comparison to the extent of the surface on which they are to be located. The net expression for the perturbed normal vector is as follows:

$$N'=N+\{Fu(N\times T)-Fv(N\times B)\}\div|N| \quad (7)$$

where Fu and Fv are the corresponding derivatives of the bump function F. FIG. 6 shows a graphical representation of the conversion of one example normal according to Equation (7). Many example height fields are commonly available. One example is a height field that simulates the pores of the peel of an orange.

Next, at step 80, for each normal in the height field, the process determines the coefficients for the parametric texture map 16. With appropriate scaling, one can assure that the integer portion of the newly computed normal points into the correct location of the look-up table. The fractional portion of the normal yields the weight for interpolation. Finally, one bilinearly interpolates each polynomial coefficient to get the appropriate coefficient for the normal from the height field. It is important to realize that the polynomial is linear in its coefficients and hence one only needs to perform six bilinear interpolations to compute the final polynomial. The result is a polynomial according to Equation (2) for each normal obtained from the height field. The corresponding polynomial coefficients are then stored as the parametric texture map 16.

With the resulting coefficients, one can evaluate the polynomial equations to render the image. At step 82, the process evaluates the diffuse contribution using the parametric texture map coefficients. Recall that the diffuse contribution is based on the light source vector L. At step 84, the process evaluates the specular contribution using the parametric texture map coefficients. Recall that the specular contribution is based on the half-angle vector H. These two contributions are composited to render the image. Although described for completeness, step 84 may be deleted if the specular contribution is zero.

By comparison, the method of FIG. 4 displays lower image quality than a conventional bump map. This is because the technique involves two approximations. However, this technique has the advantage of greater speed than conventional bump mapping. Furthermore, this technique is superior to graphics systems that do not employ bump mapping in the first place.

While the invention has been illustrated and described by means of specific embodiments, it is to be understood that numerous changes and modifications may be made therein without departing from the spirit and scope of the invention as defined in the appended claims and equivalents thereof.

What is claimed is:

1. A method of converting height fields into parametric texture maps in a computer graphics system comprising the steps of:

sampling a hemisphere equidistantly to produce an array of normals;

approximating a dot product of each sampled normal with an arbitrary unit vector to form a first set of coefficients;

transforming the first set of coefficients to canonical basis;

converting a height field to a set of height field normals; and for each height field normal, determining a second set of coefficients for a parametric texture map based on the first set of coefficients.

2. The method according to claim 1, further comprising the step of evaluating a specular contribution using parametric texture map coefficients.

3. A method of converting height fields into parametric texture maps in a computer graphics system, the system comprising a look-up table containing polynomials that are based on sampling a hemisphere equidistantly to produce an array of normals, approximating a dot product of each sampled normal with an arbitrary unit vector to form the polynomials, and transforming the polynomials to canonical basis, the method comprising the steps of:

converting a height field to height field normals; and for each height field normal, determining coefficients for a parametric texture map based on the polynomials in said look-up table.

4. The method according to claim 3, further comprising the step of evaluating a specular contribution using parametric texture map coefficients.

5. An apparatus for converting height fields into parametric texture maps in a computer graphics system comprising:

means for sampling a hemisphere equidistantly to produce an array of normals;

means for approximating a dot product of each sampled normal with an arbitrary unit vector to form a first set of coefficients;

means for transforming the first set of coefficients to canonical basis;

means for converting a height field to a set of height field normals; and for each height field normal, means for determining a second set of coefficients for a parametric texture map based on the first set of coefficients.

6. The apparatus according to claim 5, further comprising means for evaluating a specular contribution using parametric texture map coefficients.

7. The method according to claim 1, further comprising the step of evaluating a diffuse contribution using parametric texture map coefficients.

8. The method according to claim 3, further comprising the step of evaluating a diffuse contribution using parametric texture map coefficients.

9. The apparatus according to claim 5, further comprising means for evaluating a diffuse contribution using parametric texture map coefficients.

* * * * *